(12) United States Patent
Liang

(10) Patent No.: US 7,458,778 B1
(45) Date of Patent: Dec. 2, 2008

(54) TURBINE AIRFOIL WITH A BIFURCATED COUNTER FLOW SERPENTINE PATH

(75) Inventor: George Liang, Palm City, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 321 days.

(21) Appl. No.: 11/453,361

(22) Filed: Jun. 14, 2006

(51) Int. Cl.
F01D 5/08 (2006.01)

(52) U.S. Cl. .................................. 416/97 R
(58) Field of Classification Search ........... 416/97 R
See application file for complete search history.

(56) References Cited

U.S. PATENT DOCUMENTS

| | | | |
|---|---|---|---|
| 3,533,712 A | 10/1970 | Kercher | |
| 4,180,373 A | 12/1979 | Moore et al. | |
| 5,813,835 A | 9/1998 | Corsmeier et al. | |
| 5,967,752 A * | 10/1999 | Lee et al. | 416/97 R |
| 6,036,441 A | 3/2000 | Mnning et al. | |
| 6,168,381 B1 | 1/2001 | Reddy | |
| 6,705,836 B2 | 3/2004 | Bourriaud et al. | |
| 6,984,103 B2 | 1/2006 | Lee et al. | |
| 2007/0253815 A1 * | 11/2007 | Kopmels et al. | 416/97 R |

FOREIGN PATENT DOCUMENTS

JP 62228603 A * 10/1987

* cited by examiner

Primary Examiner—Richard Edgar
(74) Attorney, Agent, or Firm—John Ryznic

(57) ABSTRACT

The present invention is a serpentine cooling circuit for a turbine blade, where a pressure side 3-pass serpentine cooling passage flowing generally toward the trailing edge of the blade provides cooling for the pressure side of the blade, and a suction side 3-pass serpentine cooling passage flowing generally toward the leading edge of the blade provides cooling of the suction side of the blade. The pressure side serpentine passage is separate from the suction side serpentine passage in order than a lower pressure can be used in the suction side serpentine passage. A leading edge cooling channel supplies cooling air to a leading edge shower head arrangement of cooling holes, the leading edge channel being supplied with cooling air from the first leg of the pressure side serpentine cooling passage. A plurality of trailing edge discharge holes are supplied with cooling air from the first leg of the suction side serpentine cooling passage. A tip cooling channel is positioned between the third legs of the pressure side and the suction side serpentine passages to separate the two legs.

13 Claims, 4 Drawing Sheets

US 7,458,778 B1

TURBINE AIRFOIL WITH A BIFURCATED COUNTER FLOW SERPENTINE PATH

CROSS-REFERENCE TO RELATED APPLICATIONS

None.

STATEMENT REGARDING FEDERALLY SPONSORED RESEARCH OR DEVELOPMENT

None.

BACKGROUND OF THE INVENTION

1. Field of the Invention

The present invention relates to gas turbine engines, and more specifically to cooling of turbine airfoils.

2. Description of the Related Art including information disclosed under 37 CFR 1.97 and 1.98

In a gas turbine engine, air is pressurized in a compressor and mixed with fuel and ignited in a combustor for generating hot combustion gases. The hot gases flow downstream through turbine stages which extract energy therefrom for powering the compressor and producing useful work, such as powering a fan for propelling an aircraft in flight.

A high pressure turbine is disposed immediately downstream from the combustor and receives the hottest combustion gases from the combustor. The first stage turbine rotor blades have hollow airfoils which are supplied with a portion of air bled from the compressor for use as a coolant in removing heat from the blades during operation.

Each airfoil includes pressure and suction sidewalls joined together at opposite leading and trailing edges, and extending from root to tip. A platform is disposed at the airfoil root and defines a portion of the radially inner flow path for the combustion gases. And, a dovetail is integrally jointed to the platform for mounting the individual blades in corresponding dovetail slots in the perimeter of a rotor disk.

Since the airfoil leading edge first engages the hot combustion gases, it requires substantial cooling for obtaining a useful blade life. Heat load from the combustion gases varies around the outer surface of the airfoil from the leading to trailing edges, and along the pressure and suction sidewalls. Various cooling circuits are provided inside the airfoil for cooling the different portions thereof. The different portions of the airfoil therefore operate at different temperatures, which introduce thermal stress therein that affect low cycle fatigue life of the blade.

Airfoil cooling may be affected using convection cooling, film cooling, or impingement cooling, or combinations thereof. The leading edge of a first stage turbine airfoil typically includes several rows or columns of film cooling holes fed by a common leading edge flow chamber or channel. Other film cooling holes and trailing edge holes may be fed by corresponding internal channels, such as multi-pass serpentine cooling channels.

The airfoil may include additional film cooling holes disposed in either sidewall (pressure side or suction side) downstream of the leading edge, which are typically referred to as gill holes. Since the gill holes are typically provided with a common source of coolant inside the airfoil, and the pressure of the combustion gases outside of the airfoil varies, backflow margin across the gill holes may vary on opposite sides of the airfoil.

Backflow margin is defined as the pressure of the coolant inside the airfoil divided by the local pressure of the combustion gases outside the airfoil as experienced by each of the gill holes. Sufficient backflow margin must be maintained to prevent ingestion of the hot combustion gases into the airfoil, and ensure continuous discharge of the coolant through the gill holes.

Since the minimum required backflow margin must be set at the airfoil leading edge pr pressure sidewall, the backflow margin on the lower suction sidewall of the airfoil may be undesirably high.

FIG. 1a shows a typical Prior Art (1+3) serpentine cooling design for the first blade of the turbine. The flow path for the 3-pass flow circuit is also shown in FIG. 1b. the airfoil includes a first leading edge cooling passage 101, film cooling holes 102 to deliver cooling air from the leading edge cooling passage 101 to a second leading edge cooling passage 103, a 3-pass serpentine passage having a first leg 104, a second leg 105, and a third leg 106, and trailing edge film cooling passages 107 supplied by cooling air from the first leg 104 of the serpentine passage. For a forward flowing 3-pass serpentine cooling design used in the airfoil mid-chord region, the cooling air flows toward and discharges into the high pressure hot gas side pressure section of the pressure side of the blade. In order to satisfy the back flow margin criteria, a high cooling supply pressure is needed in order to prevent the hot gasses from flowing into the airfoil.

Since the last leg of the 3-pass serpentine cavities provides film cooling air for both sides of the airfoil, in order to satisfy the back flow margin criteria for the pressure side film row, the internal cavity pressure must be approximately 10% higher than the hot gas pressure of the pressure side of the airfoil. The high pressure required preventing inflow from the high pressure side of the airfoil (the pressure side) results in an over-pressuring of the airfoil suction side film holes since the film cooling holes of the pressure side and the suction side is connected to the same cavity.

The U.S. Pat. No. 6,168,381 B1 issued to Reddy on Jan. 2, 2001 and entitled AIRFOIL ISOLATED LEADING EDGE COOLING discloses a serpentine cooling passage design in which an isolation flow chamber (38 in FIG. 3 of this patent) is positioned between a pressure side and suction side flow channels (40 and 42 in FIG. 3), where the pressure side and suction side flow channels are the last leg in a 3-pass serpentine flow circuit, both being supplied with cooling air from a common first and second legs of the 3-pass serpentine circuit. Because both pressure side and suction side flow channels are supplied from the same upstream cooling air passage, the pressures in the pressure and suction side flow channels are the same. The same problem described above exists in the Reddy patent: a high pressure is required to prevent inflow of the hot gasses on the pressure side of the airfoil, and the suction side channel is over-pressurized resulting in excessive flow through the film cooling holes on the suction side of the airfoil.

U.S. Pat. No. 5,813,835 issued to Corsmeier et al on Sep. 29, 1998 and entitled AIR-COOLED TURBINE BLADE is another Prior Art design to improve airfoil cooling by separating the pressure side serpentine passage from the suction side serpentine passage. The Corsmeier patent (reproduced in FIGS. 2a and 2b of this disclosure) has a pressure side 3-pass serpentine cooling circuit 222 that flows from the trailing edge side of the airfoil toward the leading edge side, and a suction side 3-pass serpentine cooling circuit 224 that also flows from the trailing edge side toward the leading edge side. The Corsmeier patent also includes a leading edge cooling passage 228 (28 in FIGS. 4-8 of this patent) and a trailing edge cooling passage 230 (30 in FIGS. 4-8) for a total of four separate cooling passages in this patent. One problem with the Corsmeier patent is that the leading edge cooling passage 228 and the trailing edge cooling passage 230 are not continuous passages, but are dead-end passages which results in poor cooling air flow toward the end or tip of the passage. Most of the cooling air flows out of the passage before reaching the tip. Therefore, inadequate cooling results near the blade tip.

BRIEF SUMMARY OF THE INVENTION

A turbine blade with a serpentine cooling passage therein, in which the pressure side of the blade is cooled by a pressure side 3-pass serpentine cooling fluid passage with a first leg located near the leading edge of the blade, and a suction side 3-pass serpentine cooling passage with a first leg near the trailing edge of the blade, and in which a leading edge cooling channel is supplied with cooling air from the first leg of the pressure side serpentine passage, and a trailing edge cooling channel is supplied with cooling air from the first leg of the suction side serpentine cooling passage. The cooling circuit for the leading edge, the pressure side, the suction side, and the trailing edge are supplied with cooling air by only two circuits, which eliminates using dead-end channels for both the leading edge and trailing edge cooling channels, therefore requiring less flow and less pressure than prior art turbine blade cooling circuits.

DETAILED DESCRIPTION OF THE INVENTION

Figure 3A:
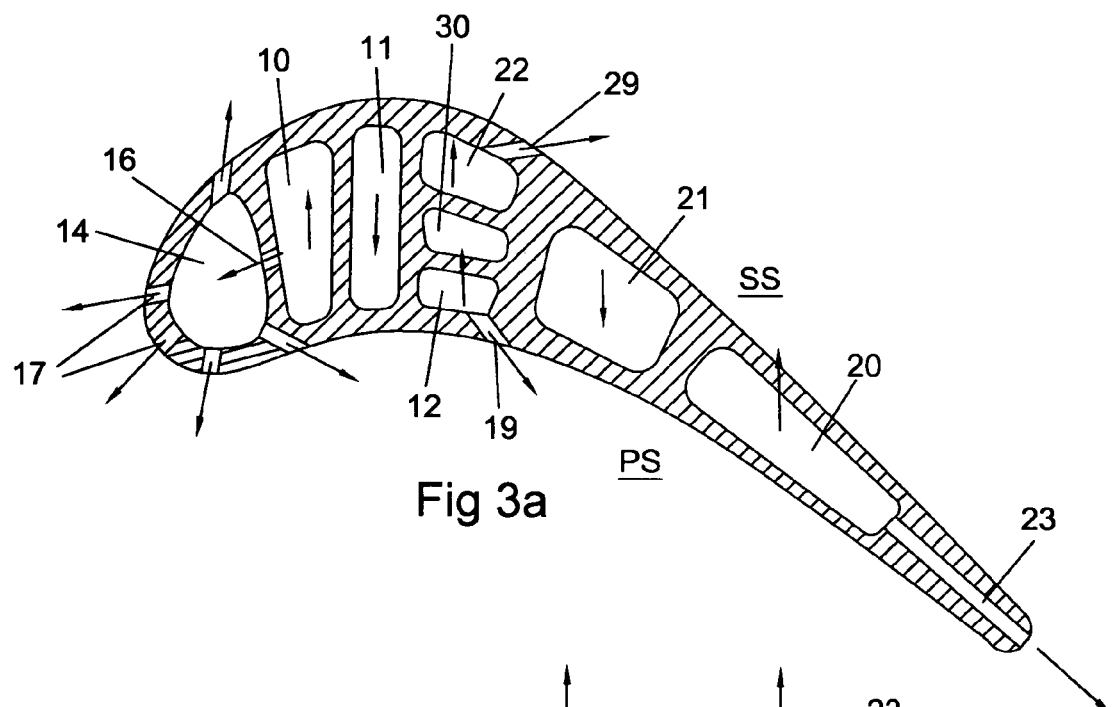
FIG. 3a shows a top cross section view of the turbine blade of the present invention.
Figure 3B:
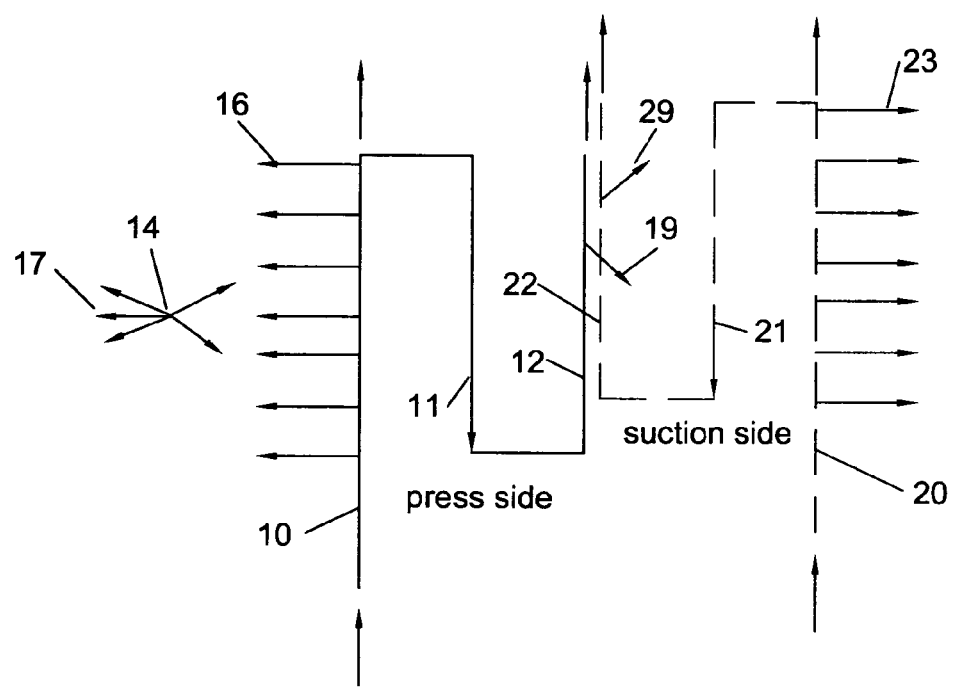
FIG. 3b shows a top cross section view of the present invention turbine blade having separate pressure side and suction side 3-pass serpentine cooling passages; and, FIG. 4 shows a cross section view of the turbine blade cooling passages of the present invention.
Figure 4:
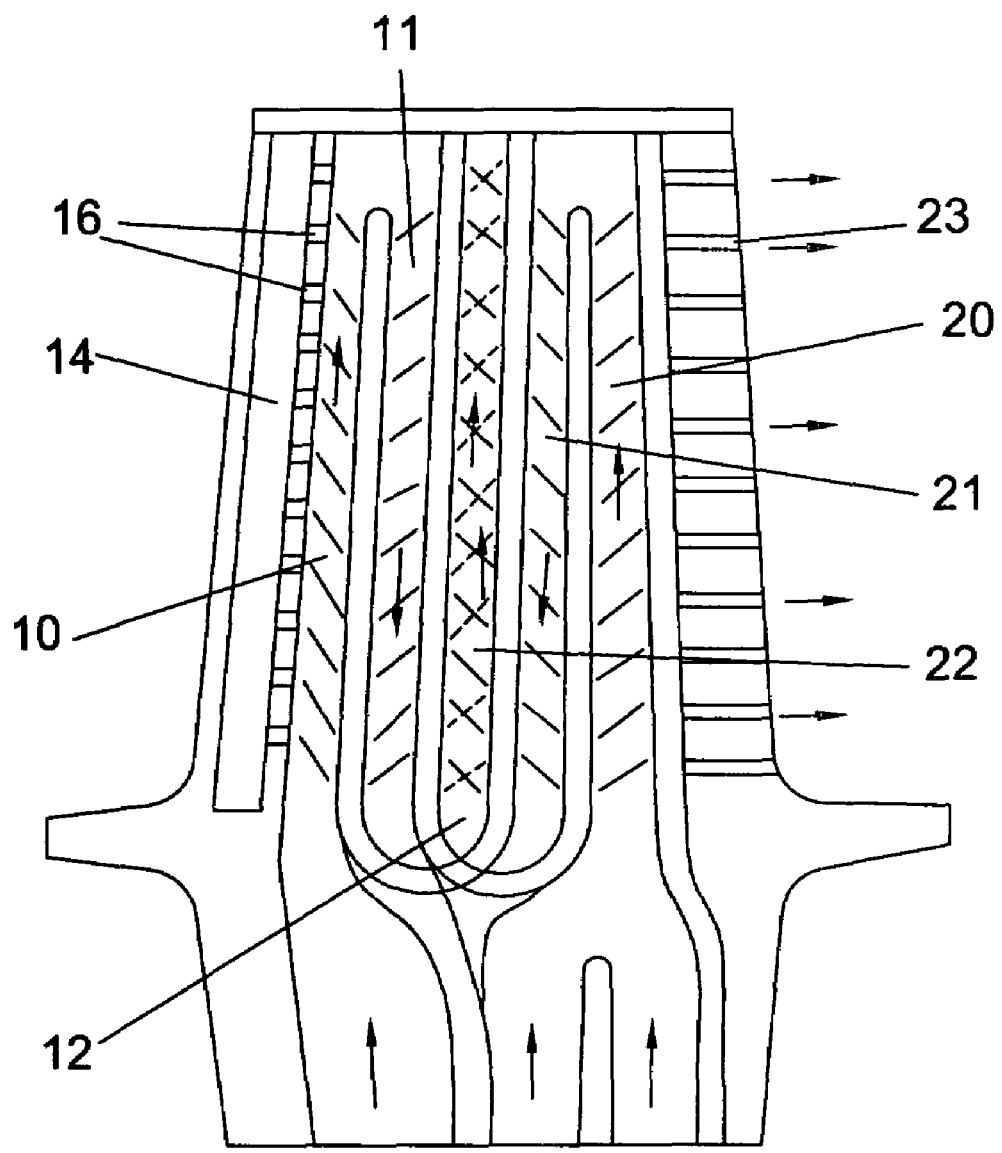

The turbine airfoil of the present invention is shown in FIG. 3a, FIG. 3b, and FIG. 4. FIG. 3a shows a top view of a cross section of the blade. The blade includes a pressure side (PS) which is also referred to as the concave side of the blade, and a suction side (SS) which is also referred to as the convex side. The blade includes two 3-pass serpentine cooling passages to provide cooling air flow through the pressure side and the suction side of the blade. The pressure side 3-pass serpentine flow circuit includes a first leg 10, a second leg 11, and a third leg 12 of the circuit. The suction side 3-pass serpentine flow circuit includes a first leg 20, a second leg 21, and a third leg 22.

The pressure side 3-pass serpentine flow circuit begins near the leading edge of the blade and flows toward the trailing edge. The suction side 3-pass serpentine flow circuit begins near the trailing edge of the blade and flows toward the leading edge. Thus, the two serpentine flow circuits flow in opposite directions along the blade. In addition, the least or third leg (12,22) of each of the two serpentine flow circuits is located on opposite sides of a third middle airfoil cooling passage 30 such that the pressure side third leg 22 provides near wall cooling of the pressure side of the blade, and the suction side third leg 12 provides near wall cooling of the suction side of the blade. Since the two serpentine flow circuits of the present invention are not in fluid communication with each other as in the above described prior art references, the fluid pressure in the suction side serpentine flow circuit can be lower than the pressure side serpentine flow circuit.

Another feature that distinguishes the present invention from the Corsmeier '835 patent is that the first leg 10 of the pressure side 3-pass serpentine flow circuit also supplies the cooling air to the leading edge channel 14 through a cooling hole passages 16. The leading edge channel 14 supplies cooling air to film cooling holes 17 that form a well known shower head cooling arrangement for the leading edge of the blade.

Another feature that distinguishes the present invention from the Corsmeier '835 patent described above is that the first leg 20 of the suction side 3-pass serpentine flow circuit also supplies the cooling air to the trailing edge of the blade through a film cooling holes 23. Thus, instead of the four cooling circuits used in the Corsmeier '835 patent, the present invention provides the same cooling for the blade using only two cooling circuits.

Separating the pressure side serpentine flow cooling circuit from the suction side serpentine flow cooling circuit allows for lower pressure in the suction side circuit. Since pressure side film cooling holes 19 supply cooling air to the pressure side of the blade from the last leg 12 of the pressure side flow circuit, and suction side film cooling holes 29 supply cooling air to the suction side of the blade from the last leg 22 of the suction side flow circuit, the suction side cooling holes 29 do not deliver more cooling air than is required as in the above described Prior Art patents.

Figure 1A:
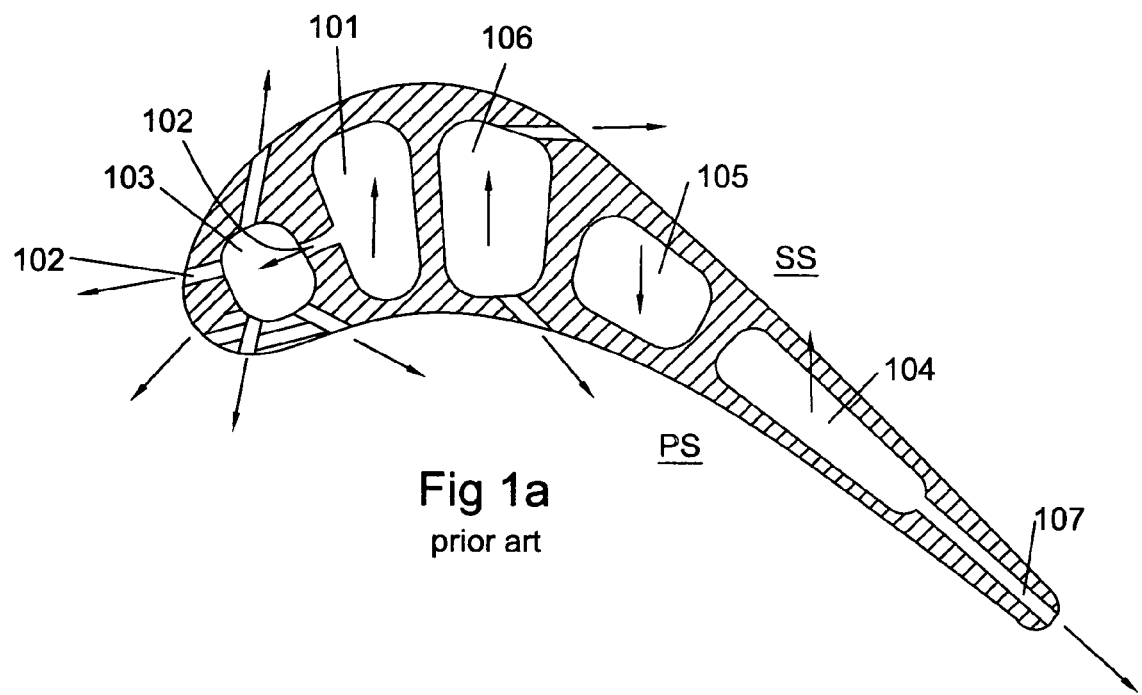
FIG. 1a shows a top cross section view of a Prior Art turbine blade having a single 3-pass serpentine flow passage.
Figure 1B:
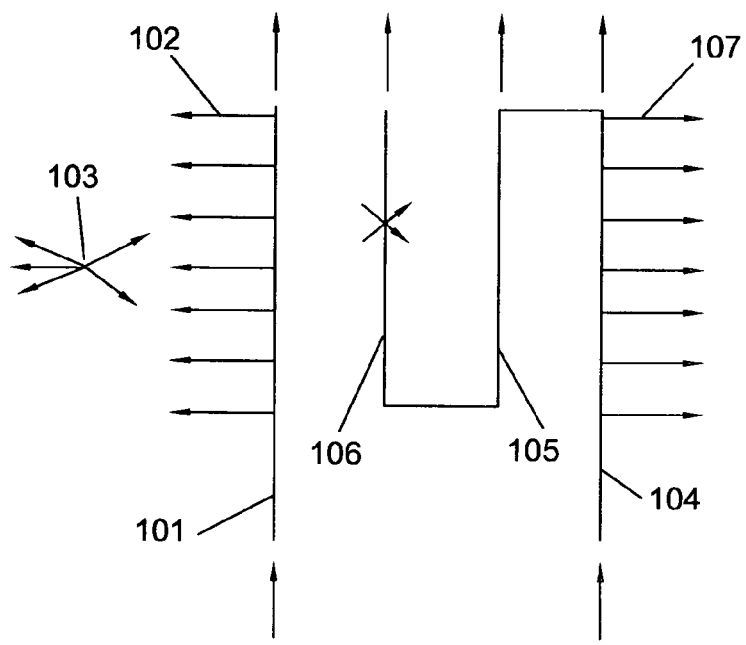
FIG. 1b shows a diagram representing the flow paths for the FIG. 1a design.
Figure 2A:
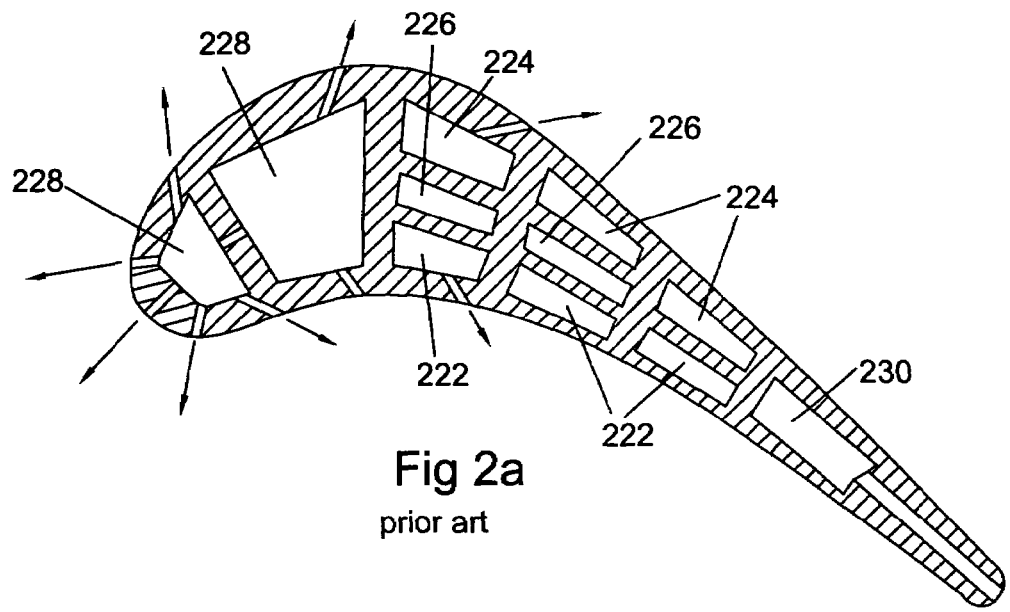
FIG. 2a shows a top cross section view of a Prior Art turbine blade having separated pressure side and suction side 3-pass serpentine cooling passages.
Figure 2B:
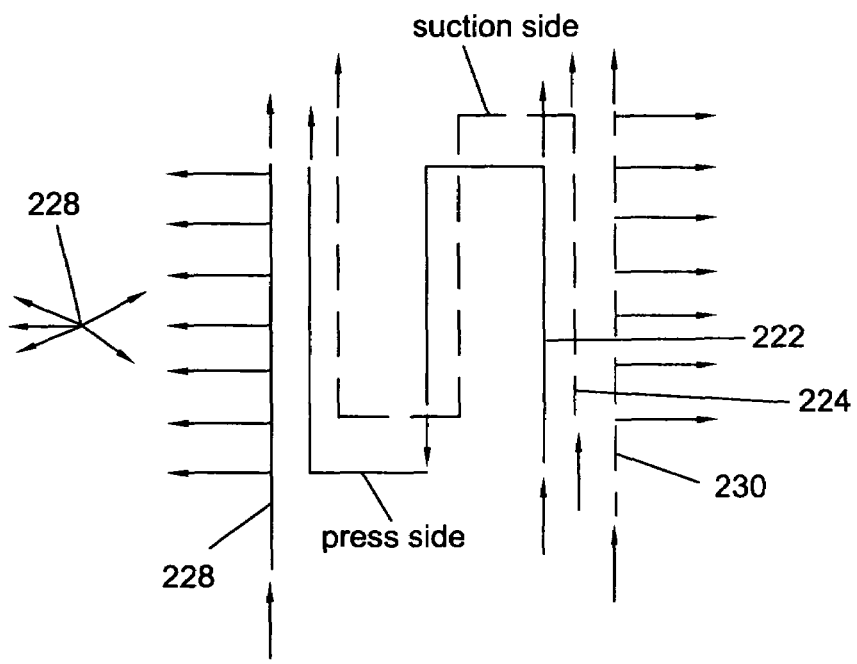
FIG. 2b shows a diagram representing the flow paths for the FIG. 2a design.

Another improved result of the present invention is the elimination of the dead-end cooling fluid passages in the leading edge or trailing edge of the blade like those used in the FIG. 1 and FIG. 2 patents. The present invention uses continuous passages in the leading edge 10 and trailing edge 20 cooling channels by combining these with the first legs (10, 20) of the respective pressure side and suction side serpentine flow cooling circuits. By providing for the leading edge 10 and trailing edge 20 cooling supply channels to be continuous, the flow volume of cooling air is enough to provide adequate cooling air for the tip regions, and high enough pressure in the cooling air to provide adequate flow through the film cooling holes.

The present invention provides an improvement in the cooling flow passages of the above described prior art designs. The present invention is a counter flow bifurcated serpentine blade cooling passage which comprises two separate 3-pass serpentine passages for the entire blade cooling system. A triple aft flowing serpentine passage provides the cooling for the forward section of the airfoil and the last leg of the serpentine ended at the pressure side of the airfoil midchord section. The aft flowing serpentine cooling flow circuit used for the airfoil pressure surface will maximize the use of cooling air to main stream gas side pressure potential as well as tailoring the airfoil external heat load. The cooling air is supplied at the airfoil forward section where the airfoil heat load is low, and thus eliminating the use for film cooling. The spent cooling air is discharged at the aft section of the airfoil where the gas side pressure is low, and therefore yields a high cooling air to main stream pressure potential to be used for the serpentine channels and maximize the internal cooling performance for the serpentine passage. In addition, the present invention yields a lower cooling supply pressure requirement and lower leakage flow.

A triple forward flowing serpentine provides for cooling for the aft section of the airfoil and the last leg of the serpentine ended at the suction side of the airfoil mid-chord section. The forward flowing serpentine cooling flow circuit used for the airfoil suction surface will maximize the use of cooling air. Cooling air is supplied at a location down stream of the airfoil suction side surface where the airfoil heat load is high. The cooling air flows forward picking up heat and then discharging to the airfoil external surface as film cooling air. This counter flow cooling design maximizes the use of cooling air and provides a very high overall cooling efficiency for the airfoil suction side surface.

In addition to the last leg of both serpentine cooling flow circuits mated at the blade mid-chord location, both of the cooling flow channels are tapered from root to tip to maximize the cooling side internal through flow velocity to achieve optimum internal heat transfer performance. An additional radial cooling cavity can be used and located between the two serpentine flow channels for cooling of the blade tip.

The invention claimed is:

1. A turbine blade comprising:
A pressure side wall and a suction side wall extending between a leading edge and a trailing edge to define an airfoil;
An aft flowing triple pass serpentine cooling circuit having a first leg nearer to the leading edge of the airfoil and a second leg adjacent to the first leg, both the first leg and the second leg extending from the pressure side wall to the suction side wall;
The third leg of the aft flowing triple pass serpentine cooling circuit being on the pressure side wall only;
A forward flowing triple pass serpentine cooling circuit having a first leg nearer to the trailing edge of the airfoil and a second leg adjacent to the first leg, both the first leg and the second leg extending from the pressure side wall to the suction side wall;
The third leg of the forward flowing triple pass serpentine cooling circuit being on the suction side wall only; and,
The aft flowing and the forward flowing triple pass serpentine cooling circuits are not fluidly connected such that cooling air from one circuit can flow into the other circuit.

2. The turbine blade of claim 1, and further comprising:
The third leg of the aft flowing triple pass serpentine cooling circuit and the third leg of the forward flowing triple pass serpentine cooling circuit are opposed to each other in the chordwise direction of the airfoil.

3. The turbine blade of claim 2, and further comprising:
A tip cooling channel positioned between the aft third leg and the forward third leg, and a tip cooling hole connected at the tip end of the tip cooling channel to supply cooling air to the blade tip.

4. The turbine blade of claim 1, and further comprising:
A leading edge impingement cavity located along the leading edge of the airfoil;
A showerhead arrangement of cooling holes connected to the leading edge impingement cavity;

And a plurality of metering and impingement holes connecting the first leg of the aft flowing triple pass serpentine cooling circuit to the leading edge impingement cavity.

5. The turbine blade of claim 4, and further comprising:
A row of pressure side film holes and a row of suction side film holes connected to the leading edge impingement cavity to discharge film cooling air onto the airfoil downstream from the showerhead holes.

6. The turbine blade of claim 1, and further comprising:
A row of exit cooling holes in the trailing edge region of the airfoil and connected to the first leg of the aft flowing triple pass serpentine cooling circuit.

7. The turbine blade of claim 1, and further comprising:
A row of pressure side film cooling holes connected to the third leg of the aft flowing triple pass serpentine cooling circuit to discharge film cooling air onto the pressure side wall of the airfoil.

8. The turbine blade of claim 1, and further comprising:
A row of suction side film cooling holes connected to the third leg of the forward flowing triple pass serpentine cooling circuit to discharge film cooling air onto the suction side wall of the airfoil.

9. The turbine blade of claim 1, and further comprising:
The aft and forward flowing triple pass serpentine cooling circuits both extend along the airfoil from the platform to the tip.

10. A process for cooling the turbine blade of claim 1 comprising the steps of:
Passing cooling air at a first pressure through the first leg of the aft flowing serpentine circuit;
Passing cooling air at a second pressure through the first leg of the forward flowing serpentine circuit;
Discharging some of the cooling air from the third leg of the aft flowing serpentine circuit onto the pressure side wall for film cooling;
Discharging some of the cooling air from the third leg of the forward flowing serpentine circuit onto the suction side wall for film cooling; and,
The first pressure being higher than the second pressure.

11. The process for cooling the turbine blade of claim 1, and further comprising the step of:
Metering a portion of the cooling air from the first leg of the aft flowing serpentine circuit;
Impinging the metered cooling air against the leading edge wall of the airfoil; and,
Discharging film cooling air from the impinging air onto the leading edge region of the airfoil.

12. The process for cooling the turbine blade of claim 11, and further comprising the step of:
Bleeding a portion of the cooling air from the first leg of the forward flowing serpentine circuit through a row of exit cooling holes to cool the trailing edge region of the airfoil.

13. The process for cooling the turbine blade of claim 12, and further comprising the step of:
Passing cooling air through a tip cooling channel located between the two third legs of the two serpentine flowing circuits and discharging the cooling air through a tip hole to cool the blade tip.

\* \* \* \* \*